(12) United States Patent
Barnes et al.

(10) Patent No.: US 8,417,085 B2
(45) Date of Patent: Apr. 9, 2013

(54) OPTICAL FIBER TERMINATION HOLDER AND METHODS FOR USING THE SAME

(75) Inventors: Brandon A. Barnes, Fort Worth, TX (US); Greg J. Scherer, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 409 days.

(21) Appl. No.: 12/550,744

(22) Filed: Aug. 31, 2009

(65) Prior Publication Data

US 2011/0052134 A1 Mar. 3, 2011

(51) Int. Cl.
*G02B 6/00* (2006.01)

(52) U.S. Cl.
USPC .................................................. 385/137

(58) Field of Classification Search ........... 385/134–137
See application file for complete search history.

(56) References Cited

U.S. PATENT DOCUMENTS

| | | | | |
|---|---|---|---|---|
| 3,885,859 A | * | 5/1975 | Dalgleish et al. | 385/72 |
| 4,217,031 A | * | 8/1980 | Mignien et al. | 385/64 |
| 4,274,708 A | * | 6/1981 | Cocito et al. | 385/95 |
| 4,871,227 A | * | 10/1989 | Tilse | 385/55 |
| 5,125,057 A | * | 6/1992 | Aberson et al. | 385/65 |
| 5,155,781 A | | 10/1992 | Doss et al. | 385/71 |
| 5,341,448 A | | 8/1994 | Huebscher | 385/97 |
| 7,407,333 B2 | * | 8/2008 | Horino et al. | 385/98 |
| 7,458,729 B2 | * | 12/2008 | Sasaki et al. | 385/55 |
| 7,546,020 B2 | * | 6/2009 | Honma | 385/137 |
| 2004/0057691 A1 | | 3/2004 | Doss et al. | 385/134 |

FOREIGN PATENT DOCUMENTS

| | | |
|---|---|---|
| EP | 0029383 A1 | 5/1981 |
| WO | WO98/47030 | 10/1998 |
| WO | WO2004/008205 A1 | 1/2004 |
| WO | WO2004/008210 A1 | 1/2004 |

\* cited by examiner

*Primary Examiner* — Daniel Petkovsek
(74) *Attorney, Agent, or Firm* — Michael E. Carroll, Jr.

(57) ABSTRACT

Disclosed are holders for preparing one or more optical fibers for termination and methods of using a holder when preparing and/or making a termination using a mechanical splice connector. In one embodiment, the optical fiber holder includes a body having a longitudinal passageway for receiving an optical fiber and a retainer. The retainer fits into a portion of an opening of the body and has a first side with a resilient member for securing one or more optical fibers to the holder. A front portion of the holder may be inserted into one or more assemblies for perform operations to prepare the at least one optical fiber for termination and/or making a termination using a mechanical splice connector.

16 Claims, 7 Drawing Sheets

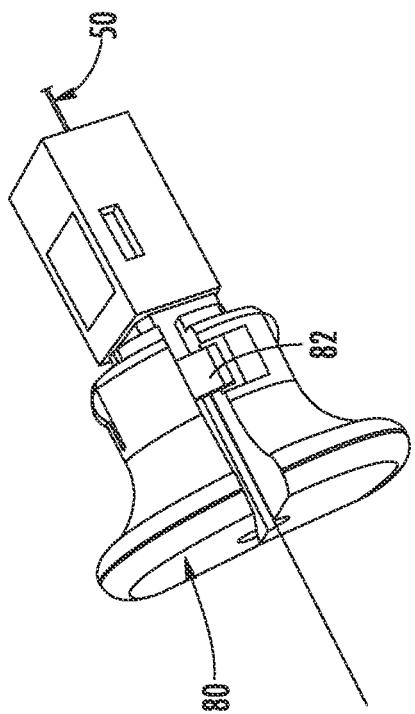
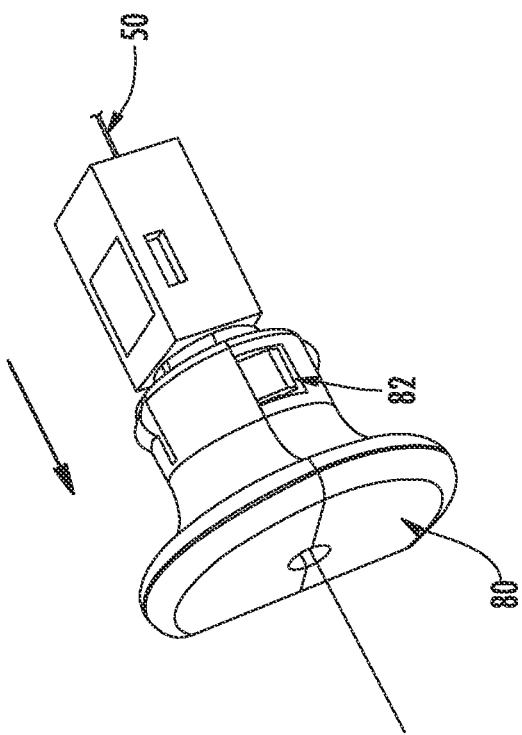
FIG. 6a
FIG. 6b

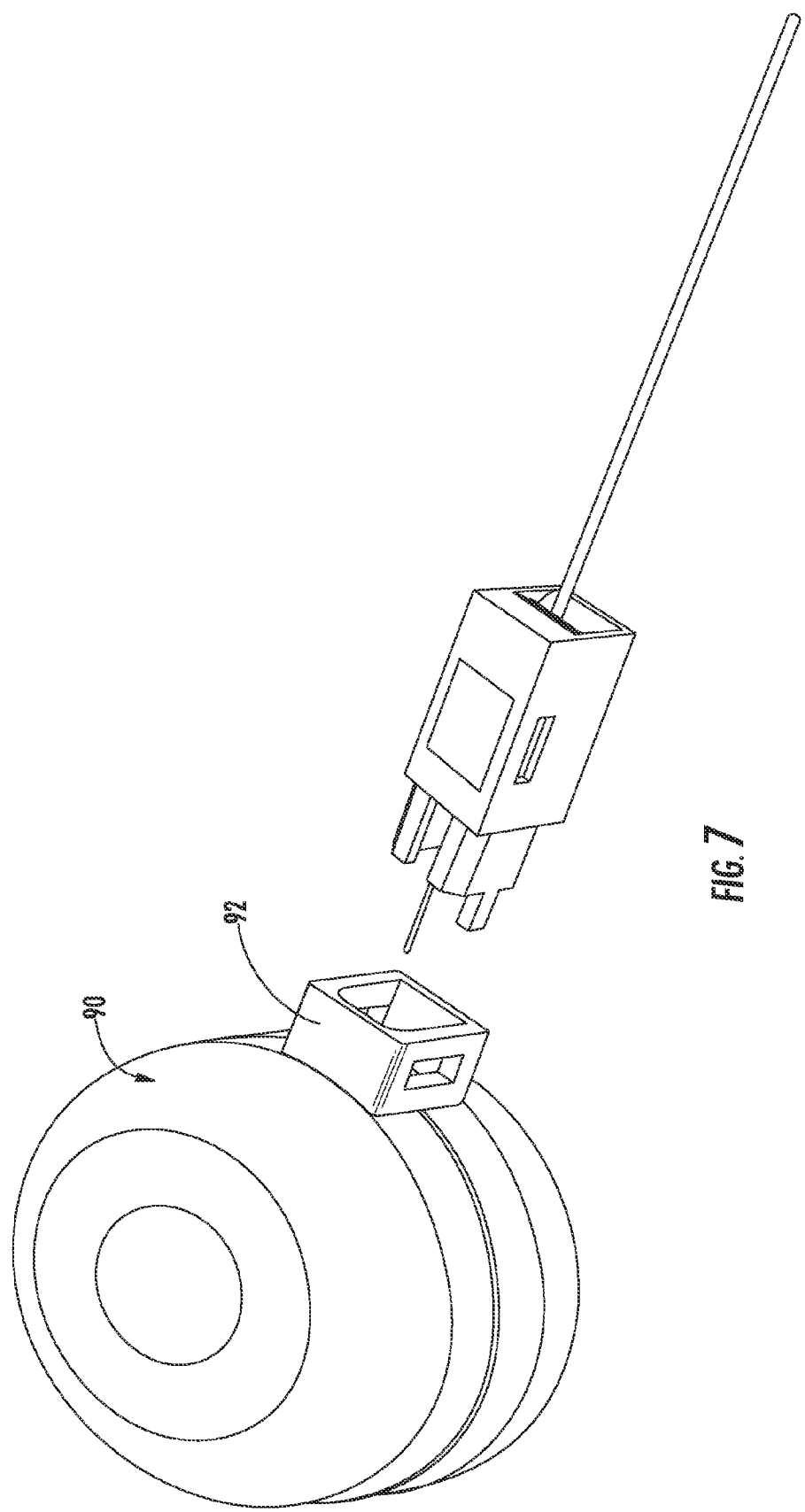

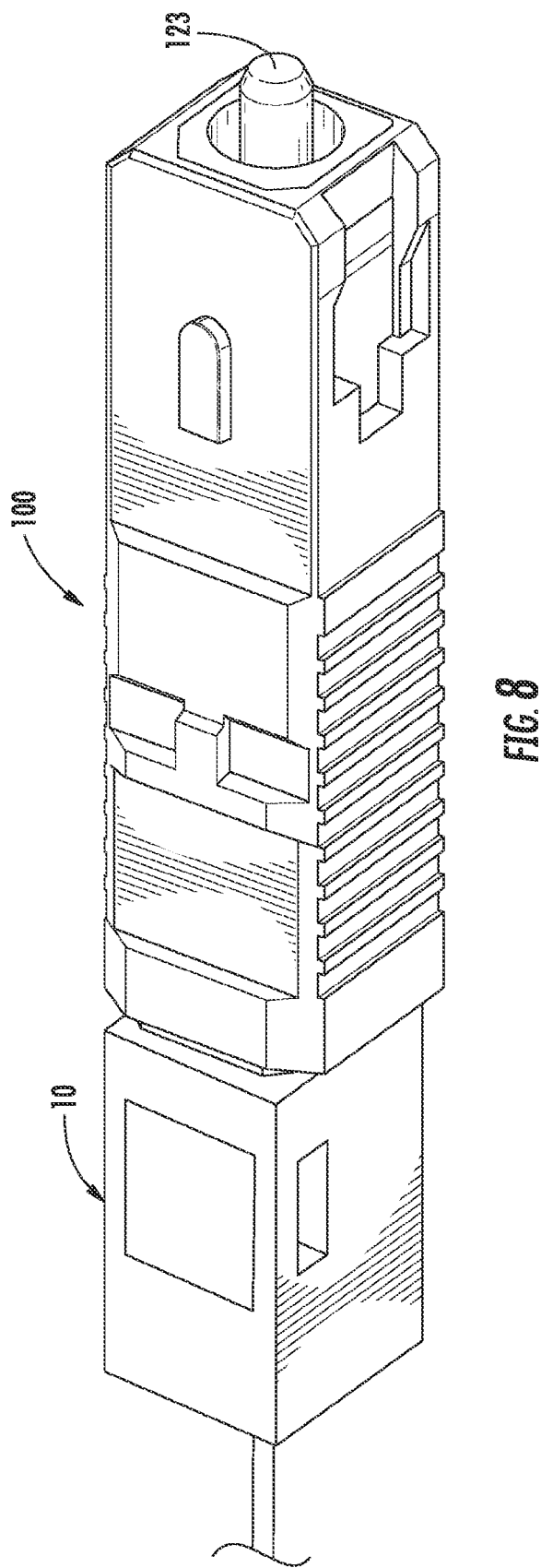

OPTICAL FIBER TERMINATION HOLDER AND METHODS FOR USING THE SAME

BACKGROUND

1. Field

The present disclosure relates generally to holders for securing one or more optical fibers. Specifically, the disclosure relates to the holders for preparing one or more optical fibers for termination and methods of using a holder when preparing and/or making a termination.

2. Technical Background

Fiber optic communication networks are experiencing explosive growth. In just a few years, the transmission of optical communication signals for voice, video, data, and the like has soared. The future growth of fiber optical networks is necessary because subscribers are still demanding more bandwidth. To accommodate the bandwidth demand, network operators are investing in and installing optical networks to route optical fibers toward the subscriber. In certain applications, the craft prefers to terminate the ends of fiber optic cable in the field to avoid issues with excess cable length and slack storage. However, conventional connectors require finishing the ferrule endface which is time-consuming and best accomplished in a factory setting with dedicated polishing and inspection equipment.

To solve these connector termination issues, mechanical splice connectors such as the UniCam® available from Corning Cable Systems of Hickory, N.C. were developed. The UniCam® connector allows the craft to make a mechanical splice connection between a field-fiber and an optical fiber stub of the connector without the need to polish a ferrule endface of the connector. However, the craft must still prepare the end of the cable having the field-fiber for termination. By way of example, the jacket and/or buffer layer on the fiber must be removed, then the coating on the optical fiber is stripped away. Finally, the optical fiber is cleaved to the correct length for the mechanical connector. Although these preparation tasks are easily performed by a skilled craftsman, an untrained person may have difficultly preparing the optical fiber for termination in a mechanical splice connector.

SUMMARY

The disclosure relates to an optical fiber holder that make preparing and terminating the optical fiber a reliable, simple, and easy task for untrained users. The optical fiber holders disclosed herein may secure one or more optical fibers therein and are configured to interface with other assemblies for preparing and/or terminating the optical fiber. Additionally, the disclosure discloses methods for preparing and/or terminating an optical fiber using a mechanical splice connector.

Additional features and advantages are set forth in the detailed description that follows, and in part will be readily apparent to those skilled in the art from that description or recognized by practicing the concepts described herein, including the detailed description that follows, the claims, and the appended drawings. It is to be understood that both the foregoing general description and the following detailed description present exemplary embodiments, and are intended to provide an overview or framework for understanding the nature and character of the invention as it is claimed. The accompanying drawings are included to provide a further understanding of the concepts, and are incorporated into and constitute a part of this specification. The drawings illustrate various embodiments, and together with the detailed description, serve to explain the principles and operations thereof.

BRIEF DESCRIPTION OF THE DRAWINGS

These and other features, aspects and advantages are better understood when the following detailed description is read with reference to the accompanying drawings, in which:

FIGS. 6*a* and 6*b* are perspective views showing the optical fiber handler interfacing with another assembly for stripping a coating from the optical fiber;

FIG. 7 is a perspective view showing the optical fiber handler interfacing with another assembly for cleaving a portion of the optical fiber;

FIG. 8 is a perspective view of the optical fiber handler of FIG. 1 attached to a mechanical splice connector, thereby terminating the optical fiber within the mechanical splice connector;

DETAILED DESCRIPTION

Reference is now made to preferred embodiments, examples of which are illustrated in the accompanying drawings. Whenever possible, the same or similar reference numbers and symbols are used throughout the drawings to refer to the same or similar parts.

Figure 1:
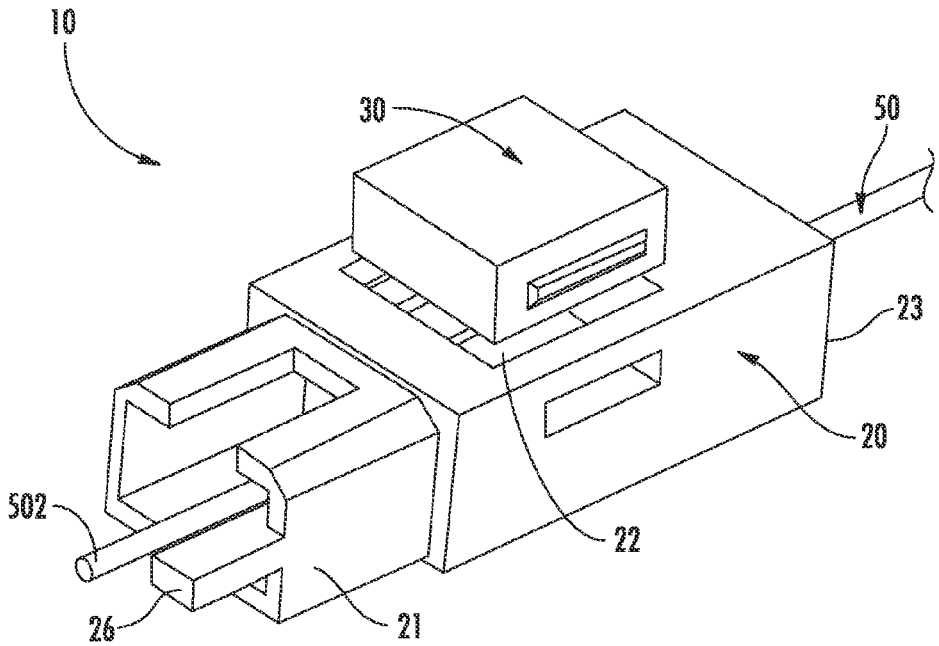
FIG. 1 is a perspective view of an optic fiber holder with an optical fiber inserted therein.
Figure 2:
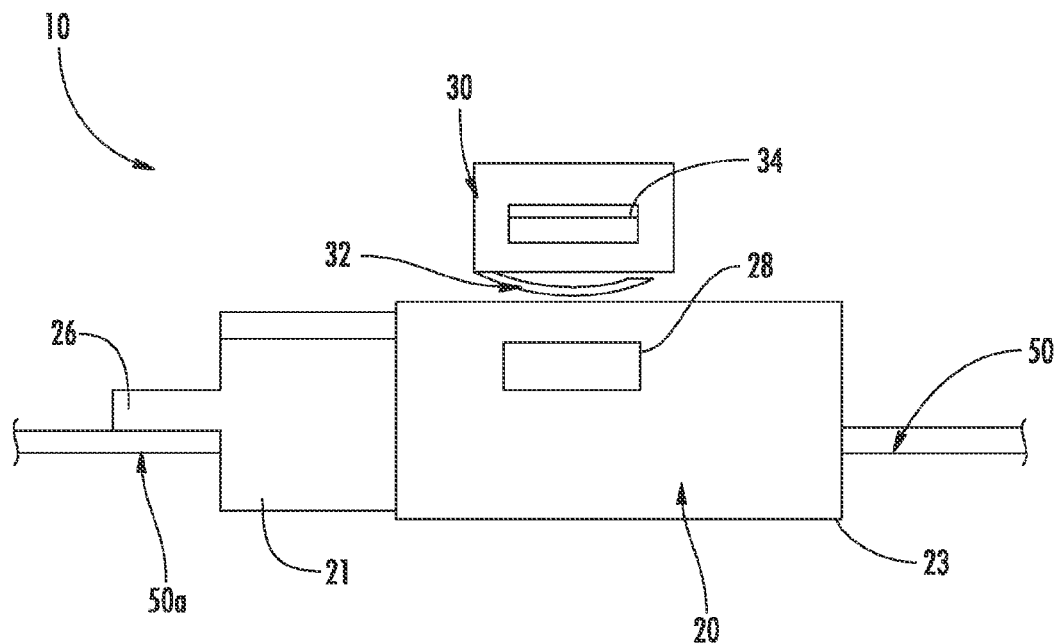
FIG. 2 is a side view of the optical fiber holder of FIG. 1 before the retainer is secured to the body.
Figure 3:
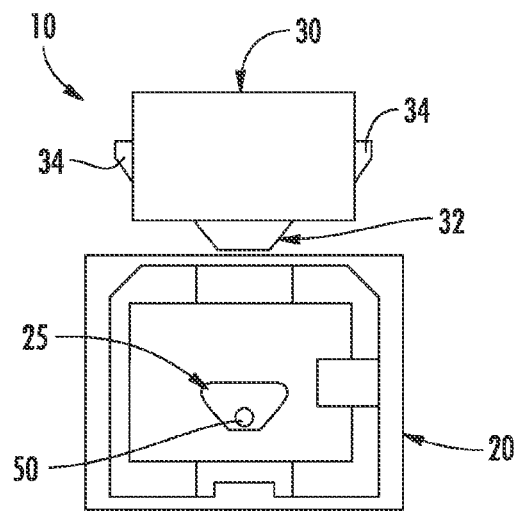
FIG. 3 is a front view of the optical fiber holder of FIG. 1 showing the optical fiber extending therethrough.

FIGS. 1 and 2 respectively show a perspective and a side view of an optical fiber holder 10 (hereinafter holder) having a body 20 and a retainer 30. Body 20 has a front portion 21 and a rear portion 23 with a longitudinal passageway 25 extending therebetween as best shown in FIG. 3. One or more optical fibers 50 may be inserted into and through longitudinal passageway 25 so that a portion 50*a* of optical fiber 50 may extend outward from (i.e., beyond) the front portion 21 of holder 10. As shown, body 20 has an opening 22 sized for receiving a portion of retainer 30 therein. Retainer 30 has a first side with a resilient member 32 that is positioned to inward toward body 20. When retainer 30 is properly attached to body 20, the optical fiber 50 is secured to holder 10 (i.e., clamped within the holder). The holders disclosed herein are advantageous since they allow the craft to easily, quickly and reliably prepare and/or terminate one or more optical fibers. For instance, holders disclosed provide strain relief, bend protection, a datum/orientation for further processing and/or cooperation with other assemblies for preparation and/or termination of the optical fiber secured therein as disclosed herein.

As shown in FIGS. 1-3, retainer 30 is sized to fit within a portion of opening 22 and includes a first side with a resilient member 32 attached thereto. In this embodiment, resilient member 32 is integrally formed with retainer 30, but other configurations are possible such as a multi-part retainer. When secured to body 20, resilient member 32 of retainer 30 secures a portion of optical fiber 50 by clamping or squeezing the optical fiber between the resilient member 32 and body 20.

Retainer 30 also includes one or more retaining features such as tabs 34 for securing the retainer to the body. As shown, retainer 30 has tabs positioned on opposite sides for being received within corresponding the retaining features, i.e., openings 28 on body 20, thereby attaching the same in position. In other words, the craft can quickly and easily snap-fit retainer 30 into body 20 by applying a downward force to secure the optical fiber in this embodiment. Stated another way, when the retainer 30 is attached to the body 20 the resilient member 32 is deflected to provide a suitable clamping force to the optical fiber. Of course, other suitable cooperating retaining features are possible for securing the retainer to the body. In other embodiments, the retainer may have a quick-release feature so that it releasable from the body, thereby aiding the craft in re-positioning the optical fiber if required or desired. In still further embodiments, the resilient member may be included on the body and pressed into position by the retainer.

FIG. 3 shows that longitudinal passageway 25 has a generally trapezoidal shape generally aligned with resilient member 32 for receiving and cooperating with the same for clamping optical fiber 50. Additionally, passageway 25 has a trough (not visible) for generally positioning the optical fiber in the correct position along longitudinal passageway 25. As best shown in FIG. 2, resilient member 32 is not attached at the rear portion of retainer 30 so that it can deflect and move at the rear portion, thereby providing a flexible quality that provides a suitable clamping force for securing the optical fiber. Moreover, the resilient member can apply a relatively constant force over a length of the optical fiber and inhibits micro-bending in the optical fiber by not applying the force at a point like conventional methods of strain relieving optical fibers.

Figure 4:
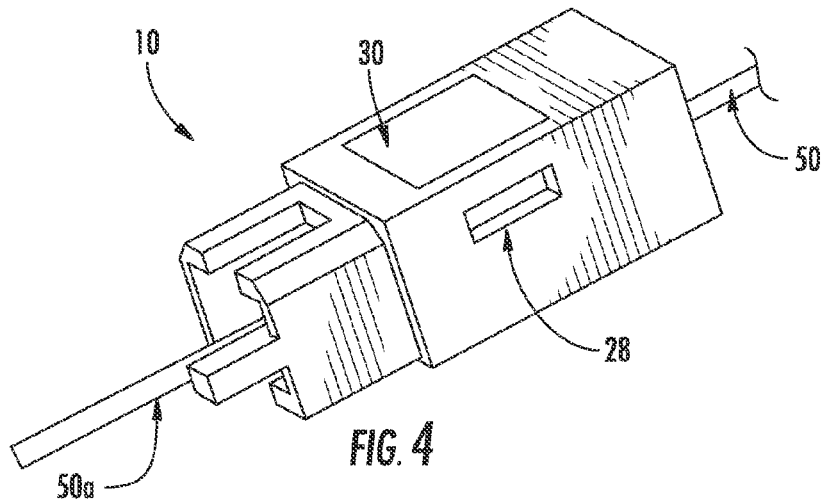
FIG. 4 is a perspective view showing the retainer secured to the body of the optical fiber holder for securing a buffered optical fiber.
Figure 4A:
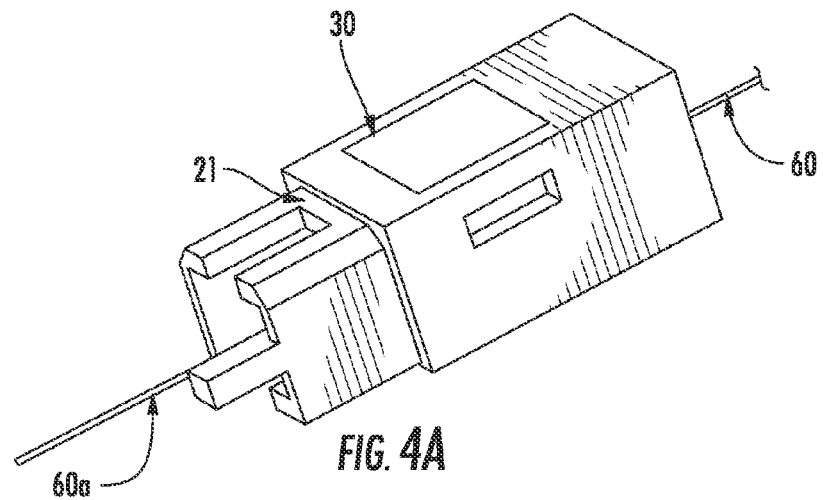
FIG. 4*a* is a perspective view showing the retainer secured to the body of the optical fiber holder for securing an optical fiber.

Moreover, unlike conventional strain relief methods that were intended for only securing one optical fiber diameter, the holders disclosed herein can advantageously secure optical fibers with different sized diameters. In other words, because the holders include a resilient member that can deflect the holders can accommodate clamping of any suitably sized optical fiber. By way of example, FIGS. 4 and 4a respectively show holder 10 securing an optical fiber 50 with a buffer layer such as a 900 micron buffer layer and an optical fiber 60 having a 250 micron outer diameter with a portion 60a extending beyond front portion 21. Of course, the holders can secure optical fibers having other sizes such as 500 microns or 700 microns; thus, a single assembly works with a range of different sized optical fibers.

Figure 5:
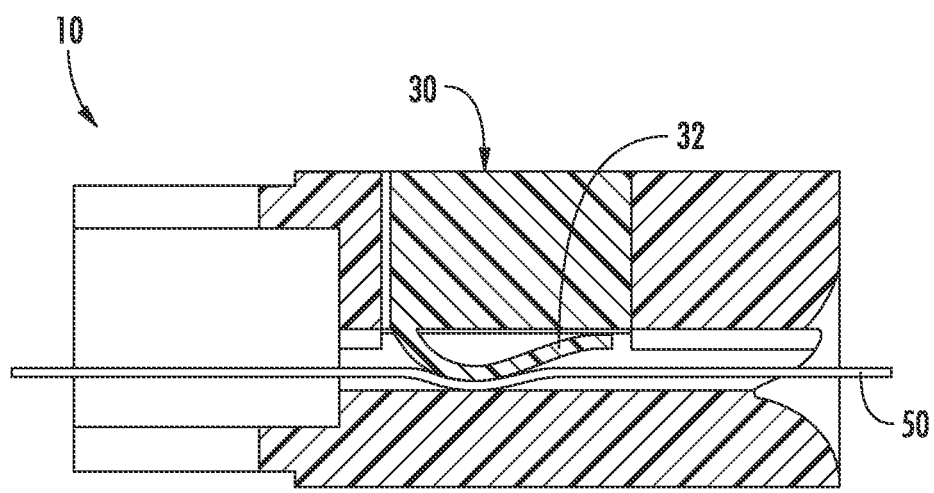
FIG. 5 is a cross-sectional view showing the optical fiber secured by the optical fiber handler.

FIG. 5 depicts a cross-sectional view of holder 10 showing the clamping of optical fiber 50 between resilient member 32 and body 20. As shown, resilient member 32 is deflected when securing optical fiber 50. The degree of deflection of resilient member 32 will vary based on the size of the optical fiber disposed within holder 10. In other words, a larger optical fiber will create more deflection of resilient member 32. Moreover, the resilient member 32 can create an undulating pathway for optical fiber 50 by pressing into the same as shown or the optical fiber can have an essentially linear pathway within the holder. In this embodiment, resilient member 32 is integrated with retainer 30 and made from the same material. For instance, retainer 30 is made from a polymer having a suitable compression and flexibility, but other suitable materials or combinations of materials are possible. Although, the resilient member 32 is shown with a generally convex undeflected shape, other undeflected shapes and/or sizes are possible such as a pad-like resilient member. Likewise, more than one resilient member may be used or it could have a multi-stage deflection and/or latching mechanism if desired.

The holders disclosed are useful since they may cooperate with one or more other assemblies for further optical fiber processing and/or termination. Body 20 of holder 10 has a front end 22 that is suited for attaching and/or mating to one or more another assemblies for performing one or more tasks for preparing and/or terminating optical fiber 50. FIGS. 6a-8 depict other explanatory assemblies that may be used with the disclosed holders for preparing and/or terminating the optical fiber. By way of example, the front end 22 of holder 10 can cooperate with another assembly such as being inserted into and/or attached to a stripper, cleaner, cleaver, and/or connector for preparing and/or terminating (i.e., connectorizing) the optical fiber.

Methods of preparing an optical fiber for termination using holders can include one or more of the steps described herein. For instance, one method of preparing an optical fiber for termination includes providing at least one optical fiber and securing the optical fiber in a holder. In one variation, the optical fiber is secured in the holder so that a portion of the optical fiber extends beyond a front portion of the holder. Thereafter, the front portion of the holder is inserted into a suitable assembly for performing an operation for preparing the optical fiber for termination. By way of example, inserting the front end of the holder into the assembly may include one or more of the operations selected from stripping a layer from a portion of the at least one optical fiber, cleaving a portion of the at least one optical fiber, and/or cleaning a portion of the at least one optical fiber. The methods disclosed may be used on one or more optical fibers and/or used with any suitable holder whether or not the holder is described/depicted herein. One explanatory method is described in more detail below.

FIGS. 6a and 6b are perspective views of handler 10 cooperating with a stripper 80 such as a buffer stripper for preparation of the end of the optical fiber 50a by removing a portion of the buffer layer from the optical fiber. However, a similar assembly is also possible for stripping the coating of the optical fiber and/or cleaning the optical fiber. Handler 10 and stripper 80 have suitable geometry for bringing them together in an abutting relationship as shown. Stated another way, handler 10 and stripper 80 can have cooperating geometry so that a portion of stripper 80 fits within and/or attaches to handler 20. Stripper 80 has a clamshell design for opening to fit about a portion of handler 10 and optical fiber 50 and includes a latch 82 for securing the same. FIG. 6a shows stripper 80 before it clamped together and FIG. 6b shows the stripper 80 after being clamped together and securing latch 82. The closing of latch 82 can also indicate to the craft that the blades of stripper 80 are engage/cut the buffer layer to the desired depth for removing the same layer from the optical fiber. Thereafter, the craft can pull the stripper 80 away from handler 10 as depicted by the arrow, thereby pulling a portion of the buffer layer from optical fiber 50. Additionally, handler 10 may cooperate with other assemblies for performing other preparation and/or termination steps as discussed herein.

Illustratively, FIG. 7 depicts a perspective view of handler 10 being inserted into a cleaver 90. Simply stated, FIG. 7 shows handler 10 cooperating with cleaver 90 to trim optical fiber 50 to the correct length for insertion and termination in a mechanical splice connector or the like. Cleaver 90 includes an interface 92 for aligning and positioning handler 10 therewith, thereby assuring that the optical fiber is cleaved to the correct length for termination. As shown, interface 92 may include recesses (not numbered) that snap-fit with structure on the handler for allowing repeatable cleave lengths; however, the cleaver can have any suitable geometry for interfacing with the handler. Cleaver 90 also includes a button 93 for cleaving the optical fiber when pushed. In other embodiments, the cleaver can be incorporated with a buffer stripper and/or an optical fiber coating stripper as desired. After cleaving operation, the optical fiber 50 within the holder 10 is ready for termination in a suitable assembly.

FIG. 8 shows holder 10 inserted into a mechanical splice connector 100 (hereinafter connector) for making a mechanical splice termination as know in the art. The mechanical splice connector 100 includes a factory-polished ferrule 123 having a stub fiber (not visible) that extends rearward in connector 100. The cleaved end of optical fiber 50 secured in holder 10 is abutted with the stub optical fiber and the two ends are held together with a mechanical splice assembly. In this embodiment, holder 10 includes a protrusion 26, which acts as a wedge or ramp for activating a mechanical splice assembly. In other words, protrusion 26 is a ramp used for biasing the splice parts of the mechanical splice assembly together, thereby holding the stub optical fiber of connector 100 and optical fiber 50 in abutting relationship to make a mechanical splice. However, other types of mechanisms are possible for biasing the splice parts together for making a mechanical splice between the stub optical fiber and the optical fiber secured in the holder. By way of example, commercially available connectors having suitable mechanical splice assemblies are available under the tradenames UniCam®, OptiSnap™, CamLite® from Corning Cable Systems of Hickory, N.C., but other suitable mechanical splice assemblies are possible.

Figure 9:
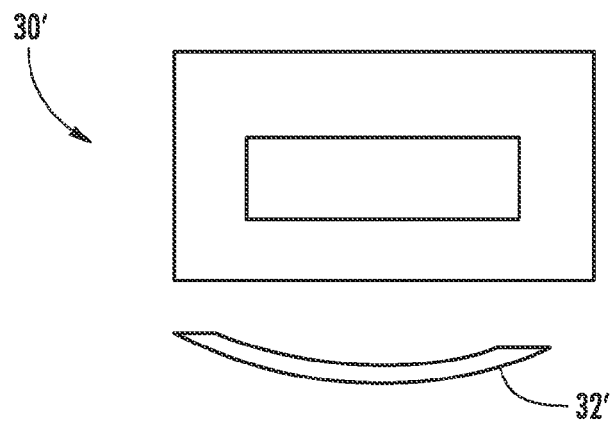
FIG. 9 shows an exploded side view of another embodiment of a retainer where a resilient member is a separate component.
Figure 10:
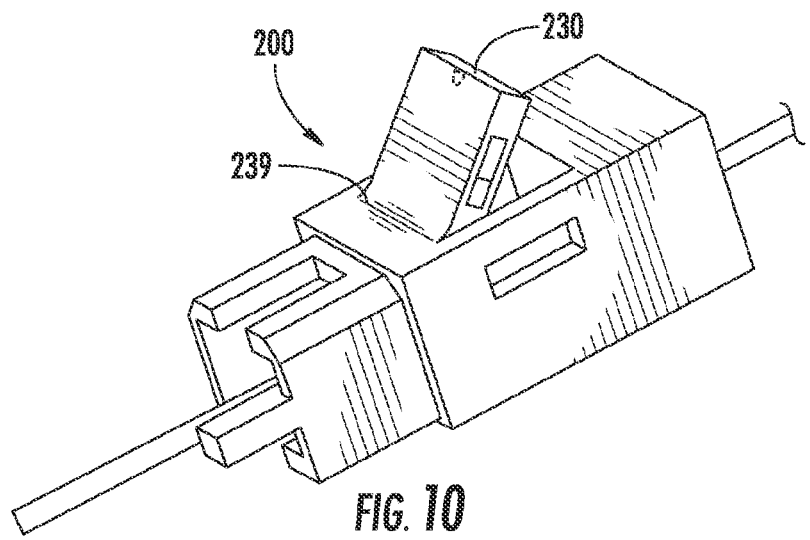
FIG. 10 is a perspective view of another embodiment of an optical fiber handler where the retainer is attached to the body of the optical fiber handler.
Figure 11:
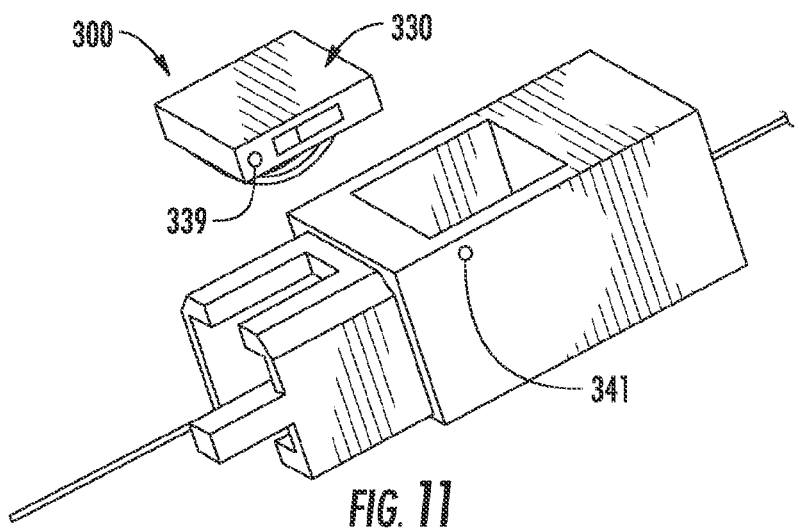
FIG. 11 is still another embodiment showing a view of a retainer having a retainer that is hinged with the body.

Other variations of holders are possible according to the concepts of the present application. Illustratively, FIG. 9 is a side view of a retainer 30' configured as a multi-piece assembly. Specifically, retainer 30' has a resilient member 32' arranged as a separate component. For instance, resilient member 32' can attach to the retainer in any suitable fashion such as a suitable fastener, adhesive or the like. Using multiple pieces for the retainer allows forming the resilient member from a different material. For instance, the resilient member may be metal spring or a resilient pad such as foam rubber that is attached to the retainer. Other variations of the holder are also possible. By way of example, FIG. 10 shows holder 200 having a retainer 230 attached to the body using a living hinge 239 so that the craft cannot misplace or lose the retainer 230. In other embodiments the retainer may be a separate piece or integrated, but that rotates about a pivot point. For instance, FIG. 11 shows a holder 300 with a retainer 330 that has a pivot 339, thereby allowing the retainer 330 to rotate relative to the body at point 341 when securing the optical fiber. This embodiment may include a hinge pin or can have the hinge pins located on the retainer and configured to snap-fit to the body.

It will be apparent to those skilled in the art that various modifications and variations can be made without departing from the spirit and scope of the invention. Thus, it is intended that the application cover the modifications and variations provided they come within the scope of the appended claims and their equivalents.

We claim:

1. An optical fiber holder, comprising:
   a body, the body having a front end, a longitudinal passageway and an opening, wherein the front end cooperates with another assembly; and
   a retainer, the retainer fitting into a portion of the opening of the body and having a first side with an integrally formed resilient member having a convex undeflected shape for securing an optical fiber by clamping the optical fiber between the resilient member and body so that a portion of the optical fiber extends beyond the front end of the body for preparing the portion of the optical fiber for termination, wherein the holder can accommodate a bare optical fiber or a buffered optical fiber.

2. The optical fiber holder of claim 1, wherein the body has one or more retaining features.

3. The optical fiber holder of claim 1, wherein the resilient member provides an undulating pathway along an optical fiber axis of the body when attached thereto.

4. The optical fiber holder of claim 1, wherein the resilient member is removable from the body.

5. The optical fiber holder of claim 1, wherein the retainer can rotate relative to the body for securing an optical fiber.

6. The optical fiber holder of claim 1, wherein the front end includes a protrusion.

7. An optical fiber holder, comprising:
   a body, the body having a front end, a longitudinal passageway with a generally trapezoidal shape, and an opening, wherein the front end cooperates with another assembly; and
   a retainer, the retainer fitting into a portion of the opening of the body and having a first side with a resilient member and the resilient member is integrally formed with the retainer with a convex undeflected shape for securing an optical fiber by clamping the optical fiber between the resilient member and body so that a portion of the optical fiber extends beyond the front end of the body for preparing the optical fiber for termination.

8. The optical fiber holder of claim 7, wherein the body has one or more retaining features.

9. The optical fiber holder of claim 7, wherein the resilient member provides an undulating pathway along an optical fiber axis of the body when attached thereto.

10. The optical fiber holder of claim 7, wherein the resilient member can accommodate a bare optical fiber or a buffered optical fiber.

11. The optical fiber holder of claim 7, wherein the front end includes a protrusion.

12. An optical fiber holder, comprising:
   an optical fiber;
   a body, the body having a longitudinal passageway with a generally trapezoidal shape and an opening; and
   a retainer, the retainer fitting into a portion of the opening of the body and having a first side with an integrally formed resilient member having a convex undeflected shape, wherein the resilient member provides an undulating pathway along an optical fiber axis of the body when the optical fiber is secured in the longitudinal passageway by clamping the optical fiber between the resilient member and body and the optical fiber extends beyond a front portion of the holder for cooperating with another assembly for preparing an optical fiber for termination.

13. The optical fiber holder of claim 12, wherein the body has one or more retaining features.

14. The optical fiber holder of claim 12, wherein the resilient member can accommodate a bare optical fiber or a buffered optical fiber.

15. The optical fiber holder of claim 12, wherein the body has a front end that is inserted into another assembly for preparing the optical fiber for termination.

16. The optical fiber holder of claim 15, wherein the front end includes a protrusion.

\* \* \* \* \*